United States Patent [19]

Young et al.

[11] 3,909,203

[45] Sept. 30, 1975

[54] ANALYSIS SYSTEM HAVING RANDOM IDENTIFICATION AND LABELING SYSTEM

[75] Inventors: Robert R. Young, Anaheim; Patrick L. Randleman; Roger C. Wilborn, both of Brea; Stanley J. Andrzejewski, Buena Park, all of Calif.

[73] Assignee: Anatronics Corporation, Anaheim, Calif.

[22] Filed: Aug. 4, 1974

[21] Appl. No.: 447,941

[52] U.S. Cl. ............ 23/253 R; 23/259; 235/61.7 R; 235/151.35
[51] Int. Cl.² ................... G01N 33/16; G01N 1/10
[58] Field of Search ................. 23/230 R, 253, 259; 141/130; 235/151.3, 151.35, 61.7 R

[56] References Cited
UNITED STATES PATENTS

| | | | |
|---|---|---|---|
| 3,532,470 | 10/1970 | Rochte | 23/253 R |
| 3,565,582 | 2/1971 | Young | 23/253 X |
| 3,644,715 | 2/1972 | Holderith | 23/253 X |
| 3,684,453 | 8/1972 | Lartigue et al. | 23/253 R |
| 3,778,790 | 12/1973 | Prost et al. | 23/253 R |
| 3,831,006 | 8/1974 | Chaffin et al. | 23/253 R |

*Primary Examiner*—R. E. Serwin
*Attorney, Agent, or Firm*—Knobbe, Martens, Olson, Hubbard & Bear

[57] ABSTRACT

An identification system for labeling specimen tubes with machine-readable data for use in an automatic chemical analysis system, the identification system providing separate input data identifying selected analysis tests to be conducted on each specimen of a given batch, the identification system also permitting random placement of input specimens in the analysis hardware. The analysis system includes electronic means for determining the location of each specimen and for correlating with each specimen independent input data identifying a test applicable to each specimen.

24 Claims, 11 Drawing Figures

U.S. Patent Sept. 30,1975 Sheet 1 of 6 3,909,203

ANALYSIS SYSTEM HAVING RANDOM IDENTIFICATION AND LABELING SYSTEM

BACKGROUND OF THE INVENTION

This invention relates to an improved apparatus and method for analyzing fluid such as blood or urine samples. For many years analysis of such specimens had been manually performed; however, more recently a wide variety of apparatus has been developed for automatically performing such functions.

In one prior art approach, specimens are serially moved past a testing station where samples of the specimen are withdrawn by a syringe type aspirator and then dispensed for the aspirator into a test container. Proper identification of samples in such prior art systems is often difficult, since the specimens are removed from their containers and often follow serially in a common tube for analysis purposes. Identification thus requires a system for counting samples at each stage of analysis, and relies on the assumption that the Nth sample in will arrive as the Nth sample at any point in the system. Such an assumption leads to identification errors which, in a medical analysis system, may be extremely dangerous.

Furthermore, few prior art systems permit a different series of analysis tests to be performed on different samples of a given batch, partially due to the difficulty of properly synchronizing the data for identifying the required tests with the data identifying each of the samples.

Identification systems for sample containers have, in the past, either required specially constructed containers adapted to holding identification cards, or special, expensive coatings on the containers themselves, so that inexpensive common specimen tubes could not be used. In addition to the features of inexpensive but reliable identification of specimens, it is desirable that an automatic analyzer apparatus permit random positioning of specimens, selectivity with regard to tests to be conducted on individual specimens, and the capability of having overlapping tests and fluid movement conducted simultaneously with other tests and movements. The combination of these features has been unattainable in the prior art.

SUMMARY OF THE INVENTION

In accordance with the preferred embodiment discussed below fluid specimens for analysis are collected in large numbers. This collection may occur, for example, in a hospital environment and will typically include, for example, batches of blood specimens requiring specific chemical analysis for the detection and diagnosis of specific diseases. Specimens are typically collected in standard cylindrical test tubes and, in the present system, these specimen tubes are accompanied by identification forms which provide not only for the identification of the tubes themselves, but, in addition, for identification of the source of the tubes, that is, the patient from whom the specimen has been taken, and the specific tests which the physician requests be made on the specimens. Each of these identifications is conveniently prepared in machine-readable form. It has been found to be extremely inconvenient to attempt to attach all of the required data to the specimen tube itself, and the present invention therefore permits the identification of the specimen tube only with a preprinted identification label bearing machine-readable data identical to a preprinted identification label on the identification form. It is also inconvenient to attempt to transport each of the specimens between the location of venepuncture and the analysis facility while maintaining the remainder of the identification form attached to the specimen tube, and the present invention therefore permits the independent handling of the identification form and the labeled specimen tube.

When a batch of specimens is ready for analysis, these specimens are placed in trays in the analysis system without concern for placing a particular specimen in a particular location within the array provided by the test tube trays. The identification forms which contain the machine-readable data identifying the tests to be conducted and the patient identification are placed in random order in the analysis system. An electronic circuit is utilized to collect the data from each of the specimen tube identification labels and, in addition, to collect the data from the identification forms. This data is then correlated so that the location of each of the identified specimen tubes is properly synchronized with the instructions indicating the source of the specimen, that is, the patient from which the specimen was taken, and the tests required on the specimen. Having correlated this data, the analysis system is designed to conduct a sequence of tests on each of the specimens in accordance with the tests identified by the physician and to produce output data for diagnostic purposes.

Further features and advantages of the present invention may be understood by reference to the following drawings in which.

DETAILED DESCRIPTION OF THE PREFERRED EMBODIMENT

Prior to the detailed description of the identification system of the present invention, a general description of the chemical analysis equipment in which the present invention is implemented is necessary. The details of this system are set forth and claimed in separate U.S. Pat. applications, Ser. No. 447,958, filed by Robert R. Young, entitled "APPARATUS AND METHOD FOR AUTOMATIC CHEMICAL ANALYSIS" and Ser. No. 447,959, filed by Patrick L. Randleman et al., entitled "FLUID TRANSPORT AND METERING SYSTEM," filed concurrently with this application, and each assigned to Anatronics Corporation, assignee of the present invention.

Figure 1:
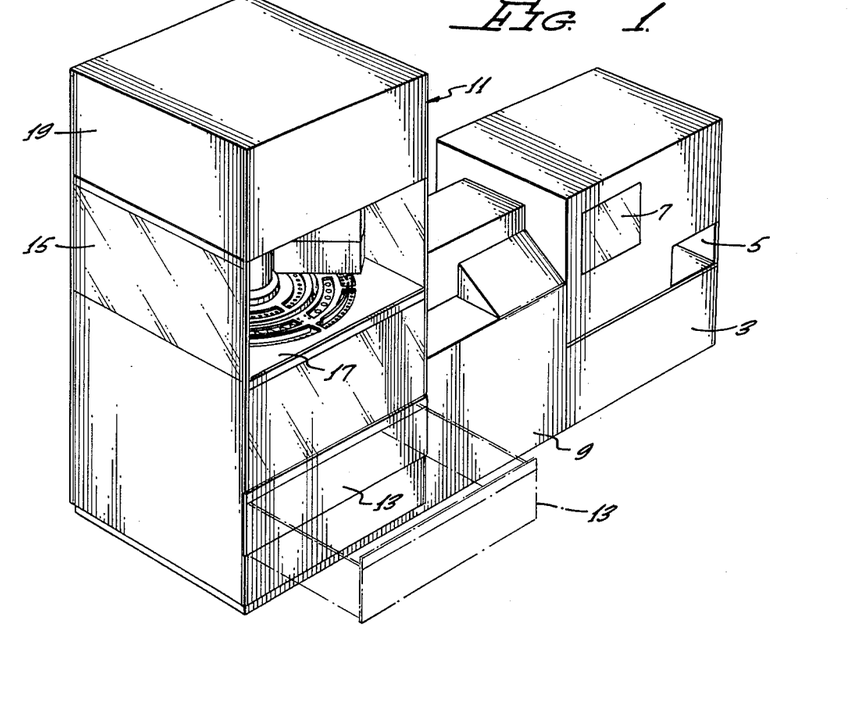
FIG. 1 is a perspective view of the overall analysis apparatus for which the present identification system is utilized.

Referring initially to FIG. 1, the chemical analysis system comprises an analyzer hardware system 11 which operates in conjunction with a general purpose digital computer or controller 3. The controller 3 includes a card reader 5 for reading input data from input cards as will be explained below. The controller 3 additionally includes a cathode ray tube display 7 and a teletype or other input/output printing device 9. The card reader 5, cathode ray tube display 7 and teletype 9 are commonly available and routinely utilized input/output devices for computer systems and provide communication between the operator and the analyzer hardware 11, the general purpose digital computer 3 providing sequencing and timing signals for control of the analyzer 11 in accordance with these communications.

Reagents or mixing with the specimens to be analyzed are conveniently stored in a drawer 13 slidably mounted in the lower portion of the analyzer 11. A central portion 15 of the analyzer 11 encloses the main chemical transfer area of the apparatus and is open on the front side for convenient access. A main support platform 17 extends horizontally within this central portion 15. The upper portion 19 of the analyzer 11 houses the majority of the electronic control components of the analyzer 11 which are connected to the controller 3.

Figure 2:
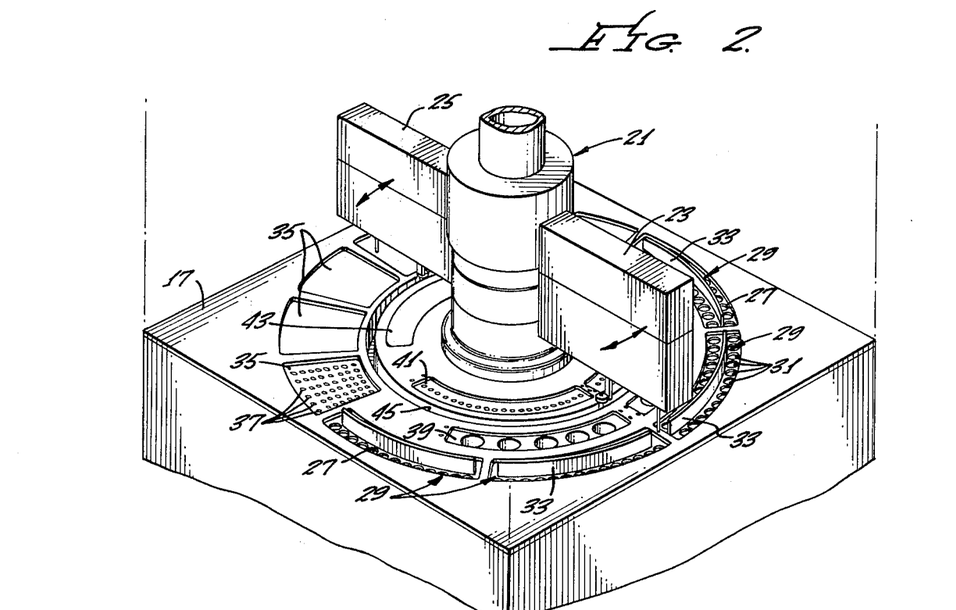
FIG. 2 is a perspective view of the main operating platform of the analyzer illustrated in FIG. 1, showing the manner in which the specimen tubes are located within specimen tube trays and placed within the platform.

Referring now to FIG. 2, the details of the chemical transfer area 15 will be described. A vertically extendig center tube assembly 21 is shown centrally supported on the platform 17. Rotatably mounted on the center tube assembly 21 is an aspirator arm 23 and a dispenser arm 25. These arms 23 and 25 are independently rotatable in either direction so that they can be moved independently in either direction over a circular central section of the platform 17. Contained in or on this circular section are a variety of spaces or compartments accessible to the aspirator and dispenser arms 23 and 25. Four arcuate spaces 27 are provided for receiving trays of specimen tubes in the platform 17, these spaces extending circumferentially along the periphery of the central section over which the aspirator arm 23 moves. Within each of the spaces 27 there is provided a tray 29 for supporting two parallel arcuate rows of specimen tubes 31. The open ends of the specimen tubes 31 face upwardly so that the tubes are accessible to the aspirator arm 23 and the body of each tube hangs beneath the platform 17. A splash rail 33 extends arcuately and upwardly from the tray 29 between the rows of tubes 31 to minimize the possibility of contamination between the tubes of two rows.

The balance of the outer periphery of the central section has a plurality of spaces containing mixing and incubation cells 35. Within each cell is located a plurality of individual mixing and incubating chambers 37 for receiving specimens transferred from the specimen tubes 31 for mixing with reagents dispensed into the chambers 37.

Spaced inwardly from the specimen tubes 31 are a plurality of dilution chamber 39 which extend in an arcuate row supported by the platform 17. As with the specimen tubes 31 and the mixing and incubation cells 35, the upper ends of the dilution chambers 39 are open so as to be accessible to the aspirator and dispenser arms 23 and 25. Reagents which need diluting are placed in the chambers 39 where they are diluted with water or other suitable fluid and stored for future use.

Spaced outwardly from the dilution chambers 39 is an arcuate row of cuvettes or tubes 41 which are arranged in two assemblies depending from the platform 17. The upper ends of the cuvette tubes 41 are open and accessible by the dispenser arm 25 so that fluid from the mixing and incubation cells 35 may be easily transferred to the cuvette tubes 41. As can be seen, the cuvette tubes extend approximately 180° around the center tube assembly 21. Additional arcuate spaces 43 are formed in the platform 17 and about the same radius as the cuvette tubes 41. These spaces may be used for additional diagnostic equipment to be added to the apparatus.

Between the cuvette tubes 41 and the dilution chambers 39 is an annular wash trough 45 extending completely around the center tube assembly 21.

Figure 3:
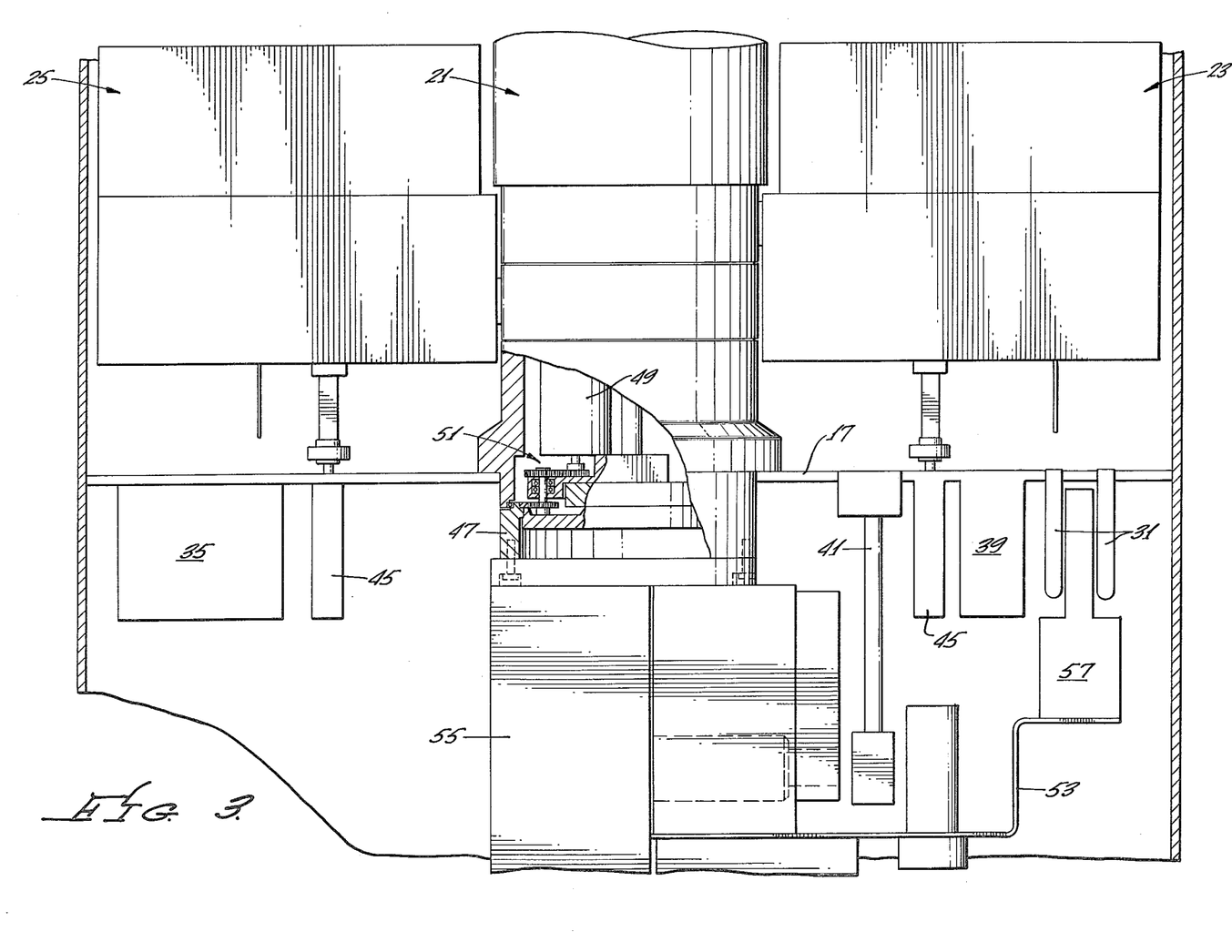
FIG. 3 is a side elevation schematic view of the analyzer of FIGS. 1 and 2.

The wash trough 45, specimen tubes 31, mixing and incubation cells 35, dilution chambers 39 and cuvette tubes 41 may all be seen in FIG. 3 depending from the platform 17.

FIG. 3 additionally shows a portion of the center tube assembly 21 extending below the platform 17. This portion includes a mounting ring 47 which is rotatably mounted on the lower end of the center tube assembly 21. The rotating ring 47 is rotated relative the center tube assembly 21 by a stepping motor 49 and appropriate gear train 51. A detection and identification arm 53 is mounted to the rotating ring 47 and supports a spectrophotometer 55 which moves adjacent the lower ends of the cuvette tubes 41 and an optical specimen tube identification reader 57 which extends upwardly between the row of specimen tubes 31 to read indicia marked on the specimen tubes as will be hereinafter described in greater detail. It will be recognized from FIG. 3 that operation of the stepping motor 49 will rotate the detection and identification arm 53 to place the optical identification reader 57 between selected specimen tubes 31.

Figures 4, 5:
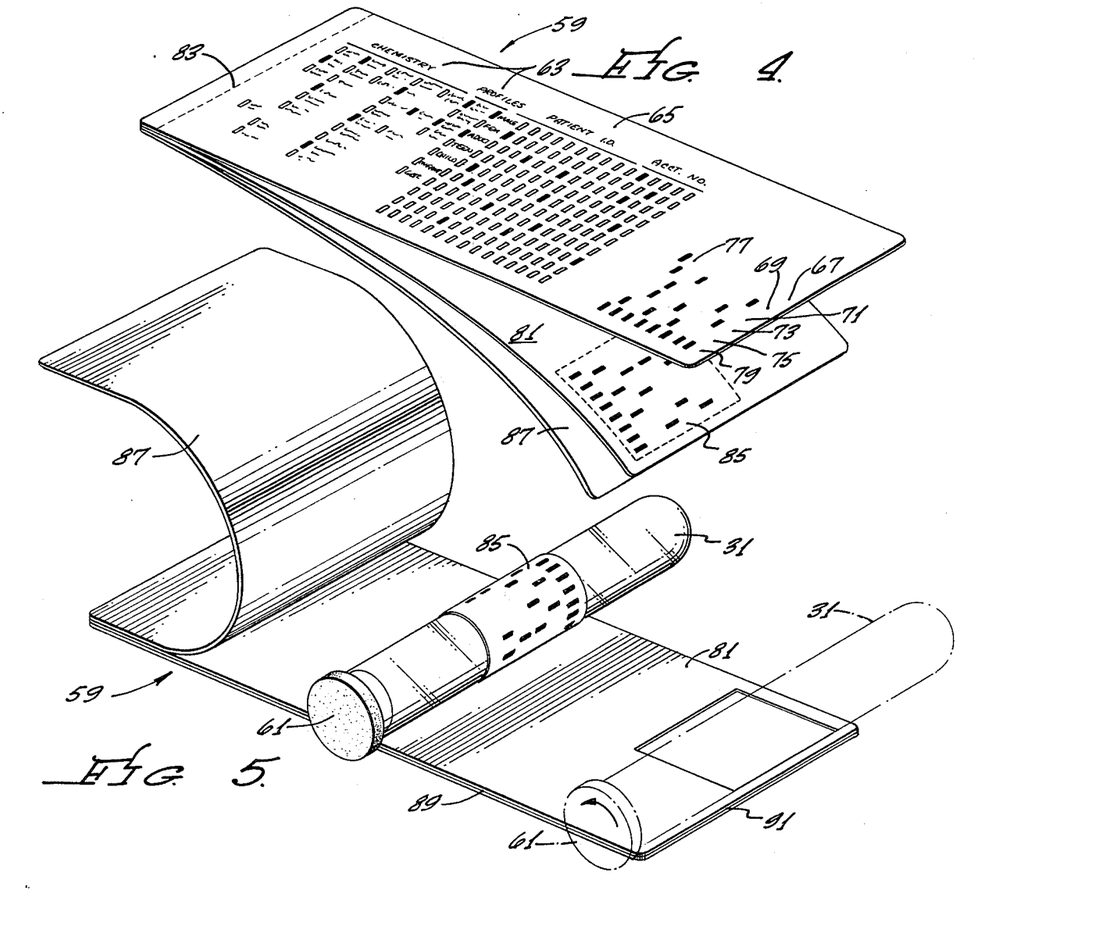
FIG. 4 is a perspective view of an identification form utilized in the present identification system.
FIG. 5 is an additional view of the identification form of FIG. 4 showing the method of application of specimen tube identification labels.

Referring to FIGS. 4 and 5, the identification forms 59 for identifying the tests to be conducted on specified test specimens and for insuring adequate identification of each such specimen will be described. In the standard practice which is used, for example in a hospital, to collect blood or urine specimens, the specimen will be placed in a specimen container or tube 31, which tube will be fitted with a stopper 61. The tubes 31 are typically common test tubes, and have a cylindrical outer configuration. The hospital technician will utilize a form, such as the form 59 shown in FIG. 5, which includes plural locations 63 for identifying the tests to be conducted on the particular test specimen. The tests will be identified by the technician by placing machine-readable identifying marks on the card 59 which may be, for example, punched locations or locations which are darkened with a lead pencil, either of which are commonly utilized in card reading systems. All of the possible tests are specified in printed form at locations 63 on the card 59, and the technician may select any one or more tests to be conducted by marking adjacent printed areas. In addition, the card 59 is punched or penciled in appropriate locations as shown at 65 to indicate the hospital identification number of the patient whose specimen is to be tested. The locations 65 may additionally include identification of the patient by sex, age, account number, etc. The hospital identification number at location 65 will, in most instances, be the same identification number utilized for many purposes within the hospital system, such as for billing etc., and distinguishes this patient from all other patients from whom such samples might be taken. In addition, the card 59 is prepunched or premarked at a location 67 with indicia, typically in binary-coded-decimal format which requires four rows 69 through 75 of multiple columns. This latter identification is not specifically related to a particular patient identification at 65, but rather is an identification number for the particular card 59 which is being utilized. The binary-coded-decimal format at 67 will typically include a start pulse indicia 77 and a series of clock pulse indicia 79, the function of which will be described below.

The card 59 carries a second sheet 81 which is removable from the main card by means of perforations 83. This sheet 81 carries an easily removable perforated section 85 which is premarked during manufacture of the card 59 with the identical binary-coded-decimal identifying indicia so that which appears at location 67 on the main card. The underside of the perforated portion 85, as viewed in FIG. 4, will carry an adhesive, and an additional sheet 87 may be conveniently attached at the perforations 83 in order to protect the adhesive prior to use.

In utilizing the form 59 shown in FIG. 4, the hospital technician will indicate the tests to be performed and complete the patient identification as indicated above, typically by penciling in appropriate boxes as provided, and will then turn the card 59 face down as shown in FIG. 5. The protective sheet 87 may be peeled back from the sheet 81 to expose the adhesive on the rear portion of the perforated section 85. A specimen tube 31 may then be placed in the position shown in dashed lines in FIG. 5, with the stopper 61 abutting a lower edge 89 of the sheet 81 and card 59. The specimen tube 31 will additionally be aligned so that one of its sides is parallel to a second edge 91 of the sheet 81, and the tubes 31 may then be rolled across the face of the sheet 81 to the position shown in solid lines in FIG. 5. The adhesive-backed perforated portion 85 will adhere to the specimen tube 31 during this operation and the perforations connecting portion 85 to sheet 81 will break due to this adhesion, so that the portion 85 will surround the specimen tube 31 to provide an identifying label. As explained above, the binary-coded-decimal information on this label 85 is identical to the binary-coded-decimal identification on the card 59 at location 67, so that the card 59 and the specimen tube 31 may now be separated for independent handling within the hospital and may be processed separately within the analysis system without concern for misidentifying the specimen.

It will be understood that the method outlined in accordance with FIG. 5 for applying the label 85 to the specimen tube 31 will assure extremely accurate alignment of the label 85, both along the vertical axis of the specimen tube 31 and along a horizontal line drawn across the tube 31 at a predetermined height. Since the specimen tube 31 will be rotated for the purpose of reading the input data from the label 85, as will be explained below, this alignment is extremely important and it will be common to include precise instructions to the user of the card 59 on the reverse side of the sheet 81 to assure compliance with the procedure shown in FIG. 5.

The optical specimen tube identification reader 57 as shown previously, is located on the detection and identification arm 53 which is mounted to rotate with the lower ring 47 of the center tube assembly 21. This rotational movement, as previously explained, is controlled by a stepping motor 49 shown in FIG. 3.

Figure 6:
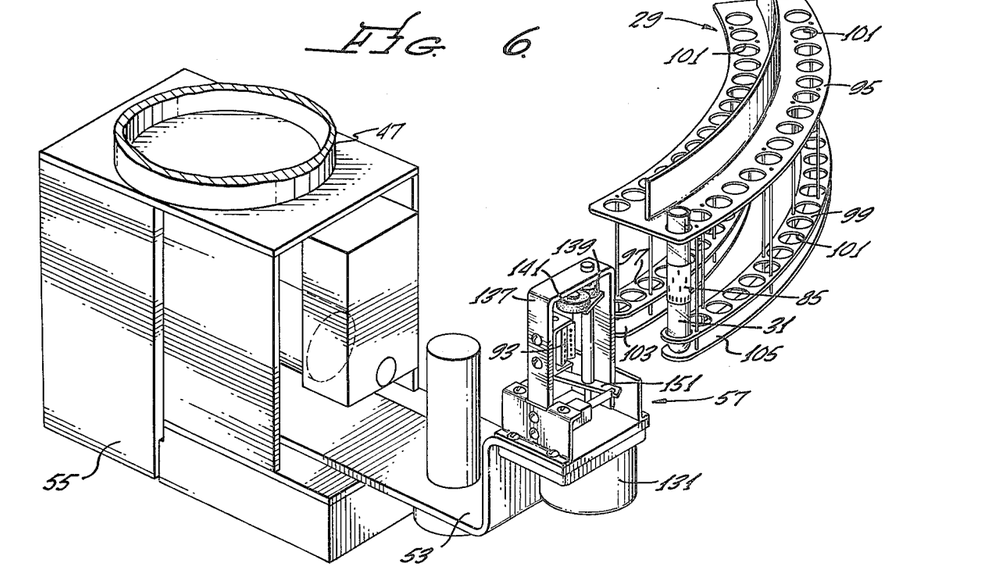
FIG. 6 is a perspective view of the specimen tube identification system and one of the series of specimen tube racks broken away from the remainder of the analysis system for ease of description.

Referring now specifically to FIG. 6, the optical specimen tube identification reader 57 is moved by the stepping motor 49 in an arcuate path to precisely align a photo-optical reader 93 with each of the specimen tubes 31 (one of which is shown) in one of the arcuate specimen tube trays 29. Thus, prior to any analysis of the specimens, the optical specimen tube identification reader 57 is moved under a sequencing control within the central processing system, to be explained below, to align the photo-optical reader 93 between each successive pair of specimen tubes 31. The specimen tube tray 29 is designed so that the specimen tubes 31 are aligned radially in pairs, which pairs are separated by the splash shield 33. Thus, at each discrete location of the identification reader 57, the identification labels 85 on a pair of specimen tubes 31 will be read by the photo-optical reader 93, and the optical specimen tube identification reader 57 will then be stepped to the next location.

The optical specimen tube identification reader 57 and its associated stepping motor 49 are under the direct control of the central controller 3. The controller 3 inherently contains data, as will be further explained below, indicating the location within the fixed specimen tube array 29 of the particular specimen tube 31 being identified.

The operation of the optical specimen tube identification reader 57 may be understood in detail through reference to FIGS. 6, 7, 8, 9 and 10, the latter four views showing the photo-optical reader 93 aligned between a specific pair of specimen tubes 31. As best shown in FIG. 6, each of these specimen tubes 31 is maintained within the specimen tube tray 29, which includes an upper arcuate plate 95 and a pair of lower arcuate plates 97 and 99, all of which plates include arcuately located and vertically aligned apertures 101 for receiving the plurality of specimen tubes 31. These apertures 101 are large enough to allow the specimen tubes 31 to be easily placed within a specimen tube tray 29 by the equipment operator and also permit rotation of the specimen tubes 31 by the optical specimen tube identification reader 57, as will be described below. In addition, the specimen tube tray 29 includes a pair of lower arcuate plates 103 and 105 containing no apertures on which the lower ends of the specimen tubes 31 rest. These plates 103 and 105 provide for vertical alignment for each of the specimen tubes 31, and thus provide precise vertical alignment of the identification labels 85 which, as explained in reference to FIG. 5, are precisely aligned relative the specimen tube 31.

Figure 7:
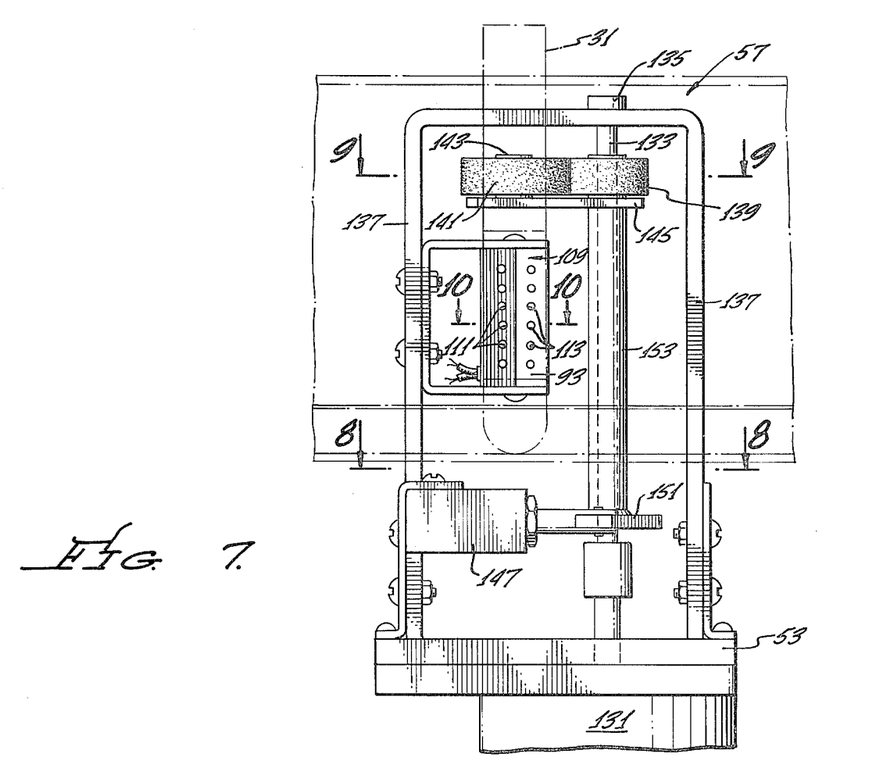
FIG. 7 is an elevation view of the specimen identification system taken from a position as shown by line 7—7 of FIG. 6.
Figure 10:
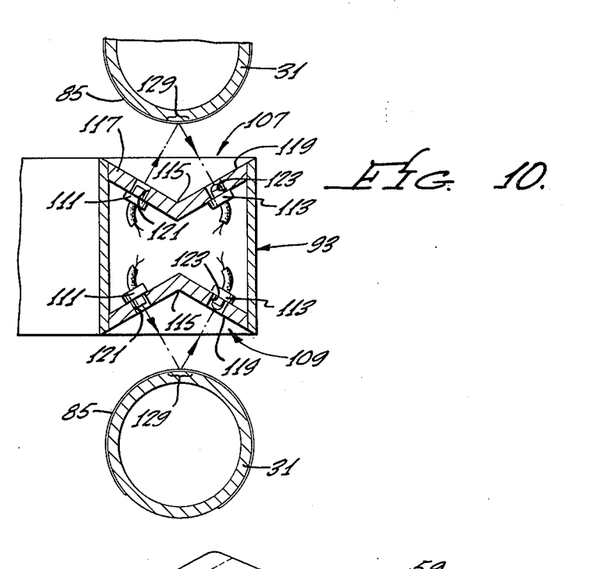
FIG. 10 is a sectional view of the photo-optical reading member taken along lines 10—10 of FIG. 7.

Referring now to FIGS. 7 and 10 the details of the construction of the photo-optical reader 93 will be explained. The pair of radially opposed sides 107 and 109 of the reader 93 each contain a plurality of light sources 111 and a plurality of light sensors 113. These elements are aligned so that a source and sensor pair exists on each side of the reader 93 at an identical vertical position. Six such light emitter-sensor pairs exist on each face 107 and 109 of the reader 93, providing for the reading of six rows of data indicia on a test tube identification label 85, this being the number of rows of binary-coded-decimal data, start pulse and clock pulse indicia on the label 85 as shown in FIG. 4.

Each of the radially opposed faces 107 and 109 of the reader 93 is machined to form an obtuse angle 115 between a pair of converging faces 117 and 119. These faces 117 and 199 are provided with a pair of bores 121 and 123 which are of a proper size to conveniently mount the light emitter 111 in the bore 121 and the light sensing element 113 in the bore 123. Each of the light emitter 111 and light sensor 113 are of common construction that is routinely utilized for the reading of printed data, and typically each of these elements will produce a light pattern or be responsive to light existing within a 15° solid cone so that a precisely defined area 129 on the face of a specimen tube 31 will be illuminated by the light emitter 111 and will be monitored by the light sensing element 113. It is therefore possible, particularly by utilizing a light emitter 111 and light sensor 113 combination which is responsive to light in the infrared region rather than in the visible light spectrum, to directly read the individual indicia printed on the identification label 85, regardless of ambient light conditions.

As will be readily recognized from the foregoing description, it is important that the identification label 85 be properly aligned on the specimen tube 31 as shown in FIG. 5, and that the specimen tube 31 be properly vertically aligned within the specimen tube tray 29 so that each of the rows of binary-coded-decimal data will be properly aligned with one of the light emitter sensor pairs for independent monitoring.

As will be explained below, the optical specimen tube identification reader 57 is designed to rotate each of the two radially aligned specimen tubes 31 independently for monitoring by the photo-optical reader 93. It is therefore convenient to energize each of the light emitters 111 on one face 107 of the reader 93 for the reading of a first specimen tube 31 as that specimen tube 31 is rotated; and to then deenergize these light emitting elements 111 and energize the light emitting elements 111 on the opposed side 109 of the reader 93 for monitoring the remaining radially aligned specimen tube 31 as this tube is rotated. It is apparent to those familiar with such data reading systems that each of the light sensing elements 113 will be independently connected to the central processing system or controller 3 where the data from each of the binary-coded-decimal rows may be independently monitored.

It will be further apparent to those familiar with such data reading systems, particularly in reference to FIG. 4, that the binary-coded-decimal data 67, in addition to including four rows of actual data indicia 69 through 75, will include a start pulse 77 and a plurality of clock pulses 79. The start pulse 77 is utilized to properly sink the input data so that its order cannot be confused. The clock pulses 79 are utilized to clock the data being read into a register in synchronism with the rotation of the specimen tube 31, the data itself not being satisfactory for such clocking purposes since a particular column of the data may include no input data indicia.

When the optical specimen tube identification reader 57 is aligned between a pair of specimen tubes 31 the photo-optical reader 93 will be aligned with the identification labels 85 which have been attached to each of the specimen tubes 31. Thus, each of the light source and sensor combinations will be aligned with one row of binary-coded-decimal data on the specimen tube identification slips. This data from the identification slip is inputted to the central processor system by the read head 93 as the specimen tube 31 is rotated, this rotation permitting the data label 85 which has been placed circumferentially around the tube to be serially scanned by the photo-optical system 93.

In order to implement this rotation, a motor 131, as shown in FIGS. 6 and 7 is attached to the detection and identification arm 53 and drives a central shaft 133. This central shaft 133 is conveniently mounted in a bearing 135 which is carried by a perimeter bracket 137. The central shaft 133 carries a rigidly attached main driving wheel 139, the periphery of which is in constant mesh with a slave wheel 141 which is used to rotate the specimen tubes 31. Both the main drive wheel 139 and the slave wheel 141 are conveniently manufactured of a flexible material such as rubber to assure an efficient transmission of the rotation of the central shaft 133 to the specimen tubes 31.

Figure 8:
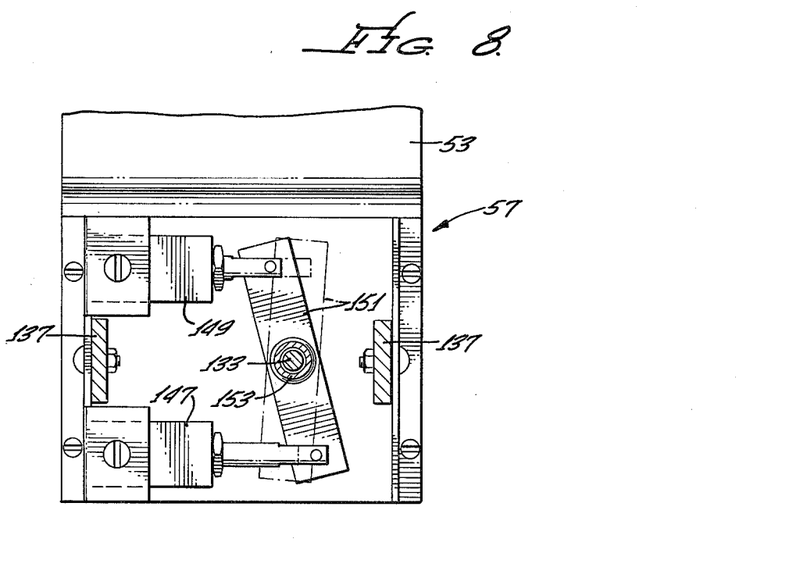
FIG. 8 is a sectional view of the specimen identification system taken along lines 8—8 of FIG. 7.
Figure 9:
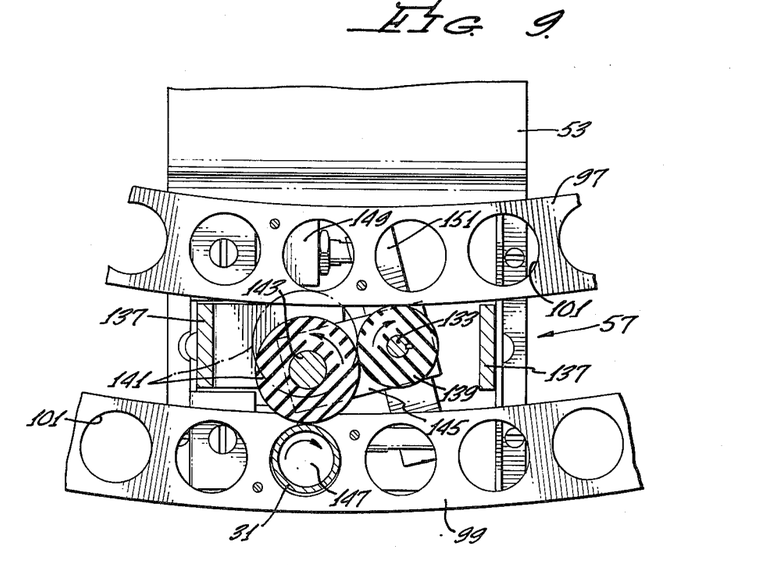
FIG. 9 is a sectional view taken along lines 9—9 of the specimen identification system of FIG. 7.

Referring now to FIGS. 7, 8 and 9, the slave wheel 141 is mounted to rotate about a shaft 143 which is in turn mounted on a positioning bracket 145 which permits the slave wheel 141 to be positioned to drive either of the radially aligned specimen tubes 31 between which the optical specimen tube identification reader 57 has been positioned. These alternate positions of the slave wheel 141 are best shown in FIG. 9, in solid and dashed lines.

A pair of solenoids 147 and 149, best shown in FIGS. 7 and 8 are rigidly connected to the perimeter bracket 137. These solenoids 147 and 149 are alternately energized by the central control system 3 after the optical specimen tube identification reader 57 has been positioned between a pair of specimen tubes 31, in order to rotate a crank arm 151 between alternate positions shown in solid and dashed lines in FIG. 8. This crank arm 151 is rigidly connected to a sleeve 153 (FIG. 7) which is concentric with and free to rotate about the main drive shaft 133 and which is in turn rigidly attached to the positioning arm 145. As can be seen from the alternate solid and dashed line positions of FIGS. 8 and 9, alternate actuation of the solenoids 147 and 149 biases the slave wheel 141 against the periphery of each of the radially aligned specimen tubes 31 so that these tubes are alternately rotated by the slave wheel 141, permitting the reading of the printed indicia on their labels 85 by the photo-optical reader 93.

Figure 11:
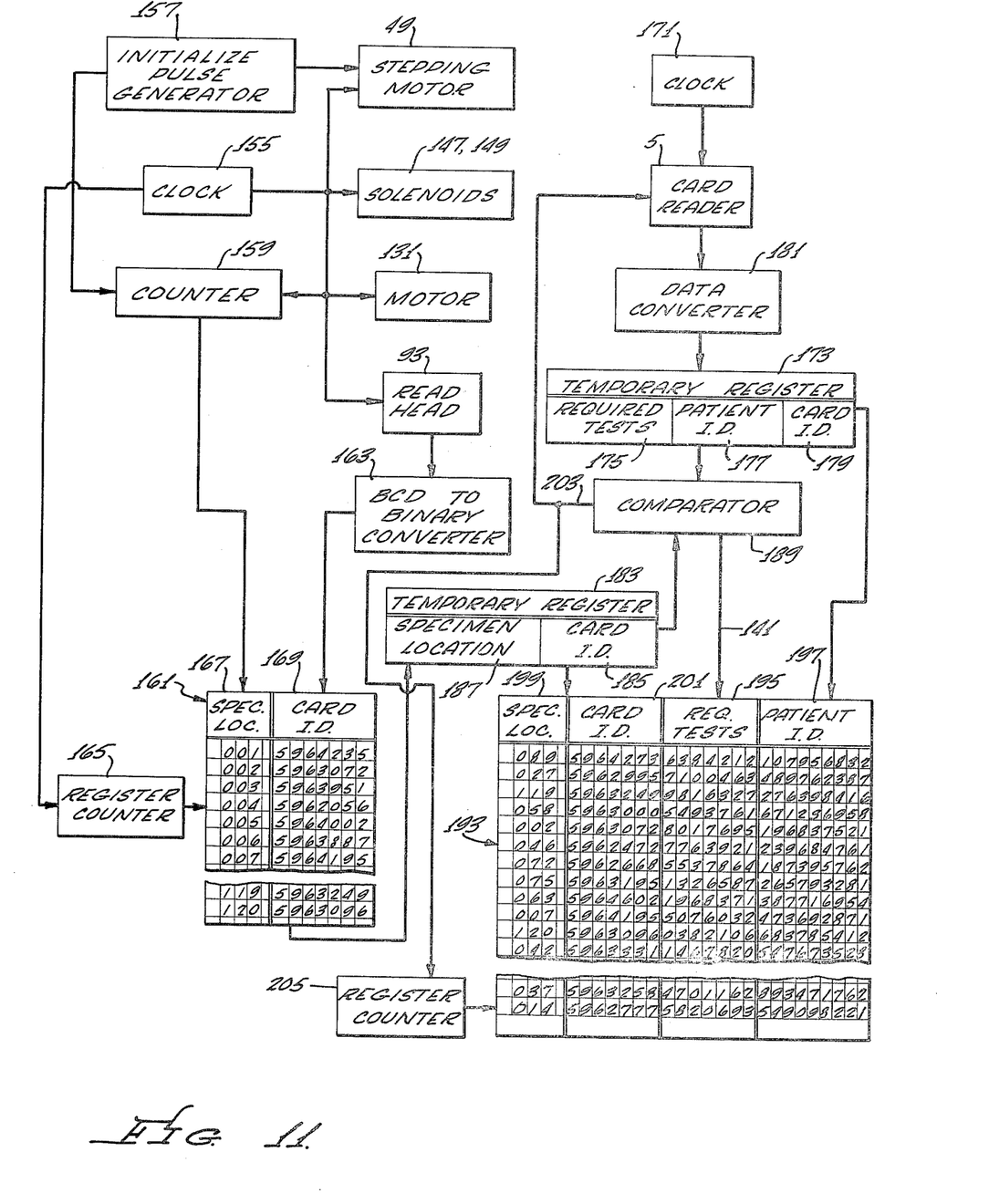
FIG. 11 is a schematic block diagram showing the electronic circuit used for reading input data from the specimen tube and a card reader and for correlating such data.

Referring now to FIG. 11, the electronic system which is utilized in conjunction with the optical specimen tube identification reader 57, described above in reference to FIGS. 6–10 will be described. The central processing control 3 includes a clock 155 for generating periodic pulses which are utilized to drive the stepping motor 49 of the optical specimen tube identification reader 57 between successive locations aligned with pairs of specimen tubes 31. The stepping motor 49 is initially driven by a pulse generator 157 at the beginning of the identification system processing in order to align the optical specimen tube identification reader 57 between the first pair of specimen tubes 31 to be identified, typically at the extreme clockwise extremity of the four arcuate spaces 27 shown in FIG. 2. In addition, the clock 155 alternately drives the solenoids 147 and 149 in order to alternately rotate radially aligned pairs of specimen tubes 31. The sequence will typically be conducted by a response of the stepping motor 49 to every other clock pulse from the clock 155 and a response of the solenoids 147 and 149 to alternating clock pulses so that each of the specimen tubes 31 may be identified before the stepping motor 49 moves the system to the next specimen pair. In addition, the clock 155 is connected to the motor 131 to rotate each of the specimen tubes, and to the photo-optical reader 93 to energize the light emitters 111 on alternate sides 107 and 109 of the reader 93 in response to alternating clock pulses, the light emitter 111 facing the specimen tube 31 which is rotated being energized. The clock 155 is additionally connected to a counter 159 which is responsive to the initialize pulse generator 157 to place a count of one in the counter 159 at the beginning of each identification sequence. Thereafter, the counter 159 will be increased by one count for each clock pulse from the clock 155 and is utilized to identify the location in the specimen tube array of the particular specimen tube 31 being identified.

The photo-optical reader 93, which is a portion of the optical specimen tube identification reader 57, as shown in FIG. 6, is connected to a specimen identification register 161 and to the clock 155, so that, at the initiation of each clock pulse, the reader 93 will output data read serially from the identification label 85 shown in FIGS. 4, 5 and 6 into the register 161. This identifying number, which, as indicated above, is in binary-coded-decimal form, may conveniently be converted to binary code in a converter 163, and then placed directly in the register 161. A register counter 165 is a routinely utilized expedient to connect the clock 155 to the register 161, and to place the data from the converter 163 in the proper sequential location within the register 161. The specimen identification from the converter 161 is conveniently placed in a predetermined number of least significant bits of the register 161, and the more significant bits are connected to the counter 159 so that each sequential position of the register 161, under control of the register counter 165, will contain, in the most significant bits, data 167 identifying the location in the specimen rack array of the specimen 31 being identified, and will contain, in the least significant bit locations, data 169 specifying the identifying number from the label 85 on the specimen tube 31.

Once all of the specimen tubes 31 have been placed within the specimen tube trays 29 on the platform 17, the various identification cards 59 which relate to the batch of specimens 31 being analyzed may be removed from sheets 81 and 87 (FIG. 4) at perforations 83, and placed in the card reader which is attached to the central control 3. This card reader 5 is a common input device in the computer art and is adapted to read the machine-readable data identifying the card 59 at location 67, identifying the tests to be conducted at location 83 and identifying the source of the specimen at 65.

The cards 59 are arranged in a stack which bears no particular relationship to the location of the specimen tubes 31 within the specimen tube trays 29 and are placed in the card reader 5. Under the control of a clock 171 the data from the first of these cards 59 is read into a temporary test identification register 173. The required test data 63 are placed in the most significant bits 175, the patient identification number data 65 is placed in the middle bits 177 and the identification data 67 from the card 59, that is, the card identification, is read into the least significant bits 179. It has been found expedient to utilize a data converter 181 to alter the format of the data at location 67 on the card 59, as shown in FIG. 5, from binary-coded-decimal to binary form and to change the data at each of locations 63 and 65 to binary form, the latter conversion typically requiring a conversion from decimal form to binary form. Each of these data format conversions is routinely accomplished by well known hardware in the computer art.

As shown in FIG. 11, the register 161 will store all of the identifying data from the specimen labels 85, and the least significant bit portion 169 will include a series of bits at one location which is identical to the least significant bits 179 of the register 173. Before the next card is read by the card reader 5, a correlation of these least significant bits is implemented.

This correlation is accomplished by utilizing the register counter 165 to sequentially read the data from each of the locations within the register 161 to a second temporary storage register 183, the data remaining in its original form so that the least significant bits 185 of register 183 contain the card identification, and the most significant bits 187 contain the specimen location. A comparator 189 is responsive to the least significant bit portions 179 and 185 of each of the data words in the temporary registers 173 and 183 and compares each combination of least significant bits until identity is recognized. If identity is not recognized between a given pair of data words, the register counter 165 places the next sequential data word from the register 161 into the temporary register 183 for comparison with the same data word in the temporary register 173. This sequence continues until identity occurs, at which point the comparator 189 will output a signal, as on a line 191, to initiate a transfer of the data from each of the temporary registers 173 and 183 to a final register 193. The temporary registers 173 and 183 will be connected to the register 193 in a manner such that the required tests and patient ID number, that is, the most significant bits 175 and 177 from the register 173 will be transferred to the least significant bit portions 195 and 197 of the register 193, and the specimen location and card ID, that is, the most significant bit portion 167 and least significant bit portion 169 from the register 183 will be placed in the most significant bit portions 199 and 201 of the register 193.

The sequence will continue, such that each time a word is placed in the register 193, an output signal is produced on a line 203 from the comparator 189 to read the next sequential data card 59 in the card reader 5 to place the next sequential data in the temporary register 173. In addition, the signal on line 203 from the comparator 189, occurring when identity exists, will update a register counter 205, so that data words are placed in sequential order in the register 193.

From the preceding explanation, it will be recognized that the data required for operating the analysis system may be properly coordinated to the use of the card ID numbers at location 67, so that the individual specimens may be placed in any arbitrary location in the specimen trays 29 or specimen array, and the individual cards may be placed in any arbitrary order in the card reader 5 without concern for losing the proper identification of each of the specimens. This procedure is particularly advantageous in that it saves a great deal of time for the operating technicians since they need not be concerned about properly ordering the input data and also assures that the proper tests and hospital identification number are applied to the proper specimen 31 so that the obvious dangers of cross identification in such an analysis system are avoided.

With the data in the format shown in register 193, the central control 3 will organize a test sequence to conduct the required analysis tests on each specimen 31, and will typically output the results of such analysis on the cathode ray tube display 7 and teletype unit 9, as explained in greater detail in the related patent applications mentioned previously.

What is claimed is:

1. Apparatus responsive to input data for measuring the chemical properties of plural specimens taken at different times and locations, comprising:
   means for physically labeling said specimens;
   means for storing said plural labeled specimens in an indexed array, said indexed array having a predetermined order;
   means mounted on said storing means for reading said label on each of said specimens to produce identification data;
   means responsive to index sequencing input data for moving said reading means to specified locations within said indexed array;
   first register means for storing in correlated register locations said identification data and said index sequencing input data for each operation of said reading means;
   second register means for storing in correlated register locations input identification data relating to each of said specimens and input data indicative of selected chemical processes to be performed on selected ones of said specimens; and
   comparator means responsive to said first register means and said second register means for comparing the identification data of said registers to produce output data corresponding to the selected tests to be conducted on specimens at selected locations in said indexed array.

2. Apparatus for measuring chemical properties as defined in claim 1 wherein said means for storing comprises an arcuate indexed array including plural arcuate segments, each segment storing specimens at spaced arcuate locations, said locations in each of said segments being radially aligned.

3. Apparatus for measuring the chemical properties of specimens as defined in claim 2 wherein said means for reading said label comprises photo-optical means mounted to rotate in an arcuate pattern adjacent said indexed array, said photo-optical means being responsive to input data to sequentially read said label on radially aligned specimens from a fixed location in said arcuate pattern.

4. Apparatus for measuring the chemical properties of plural specimens as defined in claim 1 wherein said means for storing specimens comprises plural cylindrical specimen tubes and wherein said means for reading said label comprises:
   photo-optical means mounted adjacent said tubes; and
   means for rotating said tubes.

5. Apparatus for measuring the chemical properties of specimens as defined in claim 4 wherein said means for rotating said tubes comprises means for selectively rotating each of two tubes both of which are adjacent said photo-optical means.

6. Apparatus for measuring the chemical properties of specimens as defined in claim 1 wherein said means for storing said plural specimens comprises a plurality of cylindrical tubes and wherein said means for physically labeling said specimens comprises:
   means for aligning a label relative to each of said tubes; and
   means for applying said aligned label to said tube.

7. Apparatus for measuring the chemical properties of specimens as defined in claim 6 wherein said means for aligning comprises a card removably attached to said labels and wherein said means for aligning comprises an edge of said card.

8. A data card system for identifying specimens in tubes for chemical analysis, comprising:
   a pair of card portions including identical machine-readable data indicia;
   means permitting easy removal of one of said card portions from the other;
   means on said card for aligning one of said tubes relative to said card; and
   means for transferring said one of said portions from said card to said aligned tube.

9. A data card system as defined in claim 8 wherein said means for transferring comprises adhesive on said one of said portions.

10. A data card system as defined in claim 9 wherein said means for permitting easy removal comprises perforations separating said pair of card portions.

11. A data card system as defined in claim 8 wherein said means for aligning comprises relatively perpendicular edges of said card along which said tubes are placed.

12. A data card system as defined in claim 8 wherein the other one of said card portions includes additional machine-readable data indicia identifying specific tests to be conducted on said specimens during said chemical analysis.

13. Apparatus for reading machine-readable data from a plurality of tubes arranged in aligned pairs comprising:
   a photo-optical system sensitive to machine-readable data positioned on opposed sides of said system;
   means for positioning said photo-optical system between selected aligned pairs of said tubes;
   means for alternately rotating each of said aligned pair of tubes; and
   means for selectively energizing said photo-optical system to be sensitive to data positioned on the side of said system having a rotating tube.

14. Apparatus for reading machine-readable data as defined in claim 13 wherein said means for alternately rotating comprises:

a motor mounted on said photo-optical system for rotating a main drive shaft;

a drive wheel rigidly mounted on said main drive shaft;

a slave wheel mounted to rotate about said main drive wheel, the periphery of said slave wheel being in contact with the periphery of said main drive wheel; and means for alternately rotating said slave wheel about the said main drive wheel to bias said slave wheel against alternative ones of said aligned pair of tubes.

15. Apparatus for reading data from a plurality of tubes as defined in claim 14 wherein said means for alternately rotating said slave wheel comprises a solenoid mounted on said apparatus and connected to said slave wheel.

16. Apparatus for reading data from a plurality of tubes as defined in claim 13 wherein said photo-optical system comprises a plurality of light emitters and light sensors arranged in pairs, said emitter-sensor pairs mounted on said photo-optical systems to emit and sense light over a predetermined limited area on one of said pair of tubes.

17. Apparatus for reading data from a plurality of tubes as defined in claim 16 wherein said means for selectively energizing comprises a clock for producing a periodic signal, said signal connected to alternately energize selected ones of said light emitters and additionally connected to alternate said means for rotating said aligned pair of tubes.

18. A data card system for identifying specimens for chemical analysis, comprising:

machine-readable data indicia on said card for positively identifying said card from other similar cards;

machine-readable data indicia on said card for positively identifying the source of one of said specimens;

machine-readable data indicia on said card for positively identifying a plurality of analyses to be conducted on said one of said specimens;

a removable card portion including machine-readable data indicia identical to said data for positively identifying said card; and means for attaching said removable card portion to said one of said specimens.

19. A data card system as defined in claim 18 additionally comprising:

means for aligning said removable card portion along a predetermined axis of said one of said specimens.

20. A method of identifying a specimen contained within a tube for analysis purposes, comprising:

marking a card with machine-readable data indicative of the analysis tests to be performed on said specimen;

marking said card with machine-readable data indicative of the source of said specimen;

aligning said tube on said card; and pressing said aligned tube against said card to transfer an identification label from said card to said tube.

21. A method of identifying a specimen as defined in claim 20 additionally comprising:

repeating said marking, aligning and pressing steps for a plurality of tubes and cards;

placing said tubes in random order in an analysis system;

placing said cards in said analysis system in random order; and correlating said machine-readable data on said cards with said identification labels on said tubes within said system.

22. A method of identifying a specimen for analysis purposes as defined in claim 21 wherein said correlating step comprises:

photo-optically scanning the identification label on each of said tubes to produce identification data;

producing data indicative of the location within said system of each of said tubes;

storing said data indicative of the location of said tubes and said identification data in a register;

reading said machine-readable data on said cards; and comparing said machine-readable data with the data stored in said register.

23. A method of identifying a specimen for analysis purposes as defined in claim 20 additionally comprising the steps of:

separating said tube from said card; and correlating said tube with said card in accordance with said identification label.

24. A method of measuring the chemical properties of plural specimens taken at different times and locations comprising:

physically labeling said specimens;

marking a card corresponding to each of said specimens with machine-readable data identifying said specimens and with machine-readable data identifying analysis tests to be conducted on said specimen;

storing said plural labeled specimens in an indexed array having a predetermined order;

photo-optically reading said label on each of said specimens within said indexed array to produce identification data;

storing in a register said photo-optically read identification data and data corresponding to positions within said array in a first register;

reading said machine-readable data on said cards;

storing said data read from said cards in a second register; and comparing the data in said first register with the data in said second register to produce output data corresponding to the selected tests to be conducted on specimens at selected locations in said indexed array.

* * * * *